United States Patent Office 3,472,900
Patented Oct. 14, 1969

3,472,900
PREPARATION OF TRIALKYLAMINES
Zaven A. Dadekian, Suffern, and David S. Wilbourn, Croton-on-Hudson, N.Y., assignors to Baird Chemical Industries, Inc., New York, N.Y., a corporation of New York
No Drawing. Filed Feb. 2, 1967, Ser. No. 613,411
Int. Cl. C07c 85/04, 87/123
U.S. Cl. 260—585          12 Claims

ABSTRACT OF THE DISCLOSURE

Trialkylamines are prepared by reacting alkyl chlorides or bromides with ammonia in the presence of a soluble iodide catalyst.

This invention relates to a new and improved process for the preparation of trialkylamines. More specifically, the invention teaches the preparation of these amines by the iodide catalyzed reaction of ammonia, and long-chain alkyl chloride, e.g., dodecyl chloride, or a long-chain alkyl bromide.

The long-chain trialkyl amines of the invention are useful for metallurgical applications, such as, the extraction of salts of uranium, zirconium and other valuable metals and as an intermediate for the formation of other chemicals, particularly, quaternary ammonium compounds. These latter compounds are used for secondary oil recovery, textile softeners, corrosion inhibitors, among other things.

The direct synthesis of long-chain trialkylamines by the reaction of alkyl chlorides and bromides with ammonia has never become commercially important despite the apparent simplicity of the reaction and favorable economics. Alkylation of ammonia with higher molecular weight materials appears extremely difficult because of the low activity of long-chain chlorides and bromides. Preparing tertiary amines, where each alkyl group has a high molecular weight, is very difficult because of the stearic hindrance and low reactivity of the high molecular weight mono and dialkylated intermediates, which must be further reacted to form the tertiary amines. Although some yield of each of the primary, secondary and tertiary amines can be expected under severe conditions, only a quantitative yield of the tertiary is commercially attractive. It is, for example, almost impossible to separate the secondary and tertiary amines because the extremely high molecular weights of the compounds makes distillation, even under vacuum, impractical.

The reaction of ammonia with alkyl chlorides from the economic viewpoint presents the most attractive route for the formation of trialkylamines. Little success, however, has been had with this reaction because the inactivity of these reactants prevent the formation of quantitative yields of the tertiary amines and elimination of the primary and secondary amines.

Surprisingly, it has been discovered that long-chain alkyl chlorides and bromides can be reacted with ammonia with substantially quantiative yields of a trialkylated product having outstanding color properties, if the reaction is performed in the presence of catalytic amounts of a soluble iodide, such as, potassium iodide.

Preferably, the reaction is carried out in a two-phase system. The first phase is the heavier phase and is water and/or a low molecular weight alcohol having from 1 to 6 carbon atoms, preferably isopropanol. It is in this phase that the iodide catalyst is soluble. The second phase is the lighter phase and is initially composed of the alkyl halide. As the reaction proceeds the upper phase is converted primarily to the trialkylamine and contains small amounts of unreacted halide and by-product alcohol from hydrolysis. The latter materials are readily stripped from the product. In the bottom phase, the salt formed is either dissolved or slurried, depending on the amount of water present. Generally, from ⅓ to 3 parts of the heavy phase are present for each part of the alkyl halide reacted depending on whether an alkyl bromide or chloride is reacted, the molecular weight of the reactants, and the amount of slurried salt that can be readily handled by the equipment.

The use of the low molecular weight alcohol is particularly desirable to minimize hydrolysis of the alkyl halide.

The use of the alcohol without any water, while feasible, is not generally advantageous because it limits the alkaline materials which can be used for neutralization to those which are alcohol soluble. On the other hand, the addition of alkaline materials in water solution is certainly tolerable without excessive hydrolysis and is much easier and less expensive. The use of an all water system has the advantage that phase separation is easier, since the by-product salt is soluble in the water phase. The disadvantage is that some hydrolysis of the alkyl chloride reactant takes place with resultant loss of yield.

The overall reaction of the invention may be summarized as follows:

$$3RX + NH_3 \rightarrow R_3N + 3HX$$

where R is an alkyl group having from 4 to 22 carbon atoms, preferably from 8 to 18. It may be straight or branched with an odd or even number of carbon atoms. At the outset of the reaction the ammonia reacts with the alkyl halide to form a primary amine; the latter compound reacts with additional alkyl halide to form the secondary amine; and, finally, the secondary amine reacts with still another mole of the halide to form the product tertiary amine.

Since three moles of the alkyl halide reacts for each mole of ammonia, it is desirable to add the reactants in substantially this ratio. For best product quality a slight excess, up to 10%, of the alkyl chloride is used. Of course, where ammonia is also used as the alkaline material hereinafter described, additional quantities are added.

Preferably, an alkaline material is added during the reaction in order to convert an amine hydrohalide formed in the course of the reaction back to the free intermediate amine which can be further reacted and to neutralize the hydrogen halide. The alkaline material is added after the reaction is underway, most desirably at a controlled rate so that the reaction medium does not become strongly basic. High alkalinity favors hydrolysis of the alkyl halide to the alcohol and is therefore undesirable.

The alkaline materials which may be employed are the soluble inorganic strong bases such as metal hydroxides, carbonates, and bicarbonates, and, also gaseous ammonia and the basic metal oxides and salts. Such materials may be readily selected by those skilled in the art. Preferred materials are the alkali metal, alkaline earth metal and ammonium hydroxides. These include sodium hydroxide, potassium hydroxide and calcium hydroxide. As a matter of convenience these materials may be added to the reaction mass as a 10 to 50% aqueous solution.

Sufficient alkaline material is employed to neutralize the amine hydrohalide formed in the reaction. A slight molar excess is advantageous to insure that no amine hydrohalide is left unconverted.

By the end of the reaction, at least three moles of the alkaline material for each mole of the tertiary amine formed is added with perhaps up to a 10% excess.

The alkyl chlorides includes n-octyl chloride, dodecyl chloride, tridecyl chloride, heptadecyl chloride, octadecyl chloride, and eocyl chloride. The alkyl bromides include octyl, lauryl and cetyl bromide. Examples of the tertiary amines formed by the reaction are trinonylamine; triundecylamine; tripentadecylamine; trilaurylamine; tristearylamine; trioctylamine; tridecylamine; tritetradecylamine; and heptylamine. A commercially significant product is the tertiary amine formed by combination octyl and decyl chlorides and bromides. It should be understood that mixtures of various alkyl chlorides and bromides can be used in the process.

The reaction temperature is broadly from 80° C. to 200° C., preferably from about 140 to 180° C. Reaction times of from 2 hours to 24 hours are required to complete the reaction. The temperatures and reaction times are a function of molecular weight of the alkyl halide, the lower molecular weight materials requiring lower temperatures and less reaction time. Branched chain alkyl halides require higher temperatures and more reaction time than straight chain alkyl halides with corresponding molecular weight.

Examples of the soluble iodide catalysts of the invention are ammonium iodide and the alkali metal iodides, e.g., potassium and sodium iodide. The particular cation is only important in order to provide the iodide ion in solution. The iodide ion is the effective catalytic material. From about 0.5% to 5% of the catalyst is employed based on the weight of trialkylamine, preferably from ½% to 2%.

After the completion of the reaction, the organic phase is composed substantially of the trialkylamine and isopropanol and the water phase contains salt. The bottom phase of the reactor contents is "cut" to another vessel. The organic phase is washed with a 50% caustic solution and stripped under vacuum to eliminate isopropanol and fatty alcohol hydrolysis products.

In order to more fully describe the invention, attention is directed to the following examples:

EXAMPLE 1

A one gallon autoclave is loaded with 1836 grams (9 moles) of lauryl chloride, 792 grams (9.9 moles NaOH) of 50% sodium hydroxide, 375 grams of isopropanol, and 16 grams of potassium iodide. Air is expelled by vacuum and 56.1 grams (3.3 moles) of gaseous ammonia are introduced. The batch is heated to 160° C. for 16½ hours. During the reaction the temperature varied from 160° to 171° C. and the pressure from 190 to 262 p.s.i.g. After cooling the autoclave to about 120° C., the two phases are separated and the upper phase vacuum stripped. Analysis of the final product shows the formation of 94% of trilauryl amine, 5.6% primary and secondary amine and 0.4% of other products. The equivalent weight of the product is 510 and the APHA color is 35.

EXAMPLE 2

In a one gallon autoclave, 2448 grams (12 moles) of lauryl chloride are admixed with 21 grams of potassium iodide and 533 grams of isopropanol. The batch is heated to 160° C. and maintained at a pressure of 150 p.s.i.g. by the continuous addition of ammonia. After 16 hours 245 grams (14.4 moles) of ammonia have been added. The batch is thereafter maintained under reaction conditions for an additional 8 hours. During the 24 hour reaction period the temperature varied from 150 to 165° C. Thereafter, the batch is washed with a 50% caustic solution and the product layer separated. After vacuum stripping the product is analyzed and found to contain 96.8% of trilaurylamine, 2.9% primary and secondary amines and 0.3% of other impurities. The equivalent weight is 526 and the APHA color 40.

EXAMPLE 3

Following the procedure shown in Example 1, 2480 grams (10 moles) of lauryl bromide are reacted. The reaction is discontinued after 16 hours. A water white product is obtained containing over 95% trilauryl amine.

EXAMPLE 4

Again following the procedure shown in Example 1, 1490 grams (10 moles) of octyl chloride are reacted. The two phases are separated after six hours. A water white product containing over 95% of trioctylamine is obtained.

EXAMPLE 5

Using the procedure of Example 1, 2890 (10 moles) of stearyl chloride and 51 grams (3 moles) of ammonia is reacted for 24 hours in a five gallon reactor. A water white product containing over 95% of tristearylamine is obtained.

It should be understood that the above examples are illustrative only and not intended to limit the invention.

Having thus described our invention, what we claim and desire to protect by Letters Patent is:

1. A process for the preparation of a trialkylamine which comprises: reacting an alkyl chloride or alkyl bromide having from 4 to 22 carbon atoms with ammonia in the presence of ammonium or an alkali metal iodide catalyst at a temperature from 80 to 200° C. and neutralizing the amine hydrochloride or amine hydrobromide formed during the reaction with an alkaline material.

2. A process for the formation of a trialkylamine which comprises reacting an alkyl chloride or alkyl bromide having from 8 to 18 carbon atoms with ammonia in a two-phase system wherein the first phase is said alkyl chloride or alkyl bromide and the second phase is water and/or a low molecular weight alcohol in the presence of an ammonium or alkali metal iodide catalyst at a temperature from 80 to 200° C., neutralizing amine hydrochloride or amine hydrobromide formed during the reaction with an alkaline material, thereby forming said trialkylamine reaction product.

3. The process of claim 2 wherein said soluble iodide catalyst is an alkali metal iodide.

4. The process of claim 3 wherein said alkaline metal iodide is potassium iodide.

5. The process of claim 2 wherein said second phase is water.

6. The process of claim 2 wherein said second phase is water and isopropanol.

7. The process of claim 2 wherein said alkyl chloride is decyl chloride.

8. The process of claim 2 wherein said alkyl chloride is dodecyl chloride.

9. The process of claim 2 wherein said chloride is octadecyl chloride.

10. The process of claim 2 wherein the reaction is performed at a temperature of 120 to 190° C.

11. The process of claim 2 wherein the alkaline material addition is controlled so as to avoid the presence of excess of the free alkaline material during the reaction.

12. The process of claim 2 wherein said alkaline material is caustic soda.

References Cited

UNITED STATES PATENTS 2,040,396 5/1936 Morrell et al.
2,304,637 12/1942 Hardy.

CHARLES B. PARKER, Primary Examiner

R. L. RAYMOND, Assistant Examiner